US010260813B2

(12) United States Patent
Carolla et al.

(10) Patent No.: US 10,260,813 B2
(45) Date of Patent: Apr. 16, 2019

(54) INTEGRAL SELF-SUPPORTING REFRACTORY CHECKER BRICK MODULES FOR GLASS FURNACE REGENERATOR STRUCTURES, AND METHODS OF FORMING SAME

(71) Applicant: FOSBEL, INC., Brook Park, OH (US)

(72) Inventors: Lou Carolla, Brook Park, OH (US); Michael Smith, Brook Park, OH (US); Alan E. Bowser, Jr., Brook Park, OH (US)

(73) Assignee: FOSBEL, INC., Brook Park, OH (US)

( * ) Notice: Subject to any disclaimer, the term of this patent is extended or adjusted under 35 U.S.C. 154(b) by 540 days.

(21) Appl. No.: 15/013,330

(22) Filed: Feb. 2, 2016

(65) Prior Publication Data

US 2016/0231058 A1    Aug. 11, 2016

Related U.S. Application Data

(60) Provisional application No. 62/111,460, filed on Feb. 3, 2015.

(30) Foreign Application Priority Data

Feb. 25, 2015    (GB) .................................. 1503141.2

(51) Int. Cl.
   *C03B 5/237*      (2006.01)
   *C21B 9/02*       (2006.01)
   (Continued)

(52) U.S. Cl.
   CPC ............ *F27D 1/042* (2013.01); *C03B 5/2375* (2013.01); *C21B 9/02* (2013.01); *F27D 1/0006* (2013.01); *F27D 1/06* (2013.01); *Y02P 40/535* (2015.11)

(58) Field of Classification Search
   CPC ... F27D 1/04; F27D 1/042; F27D 1/06; F27D 1/063; C03B 5/2375; C21B 9/02
   See application file for complete search history.

(56) References Cited

U.S. PATENT DOCUMENTS

| 4,436,144 A * | 3/1984 | Horak ..................... C03B 5/237 |
| | | 165/9.1 |
| 4,540,039 A * | 9/1985 | Karl ........................ C03B 5/237 |
| | | 165/9.1 |

(Continued)

FOREIGN PATENT DOCUMENTS

| GB | 1 523 476 | 8/1978 |
| JP | 2-51430 | 2/1990 |

(Continued)

OTHER PUBLICATIONS

Search Report for GB 1503141.2 dated Sep. 30, 2015, 1 page.
International Search Report and Written Opinion, PCT/US2016/016125, dated May 3, 2016.

*Primary Examiner* — David J Laux
(74) *Attorney, Agent, or Firm* — Nixon & Vanderhye P.C.

(57) ABSTRACT

Refractory checker brick modules for glass furnace regenerators are provided which include multiple preformed refractory checker bricks (e.g., tubular checker bricks, cruciform checker bricks, interweave checker bricks, interlock checker bricks, pigeon-hole checker bricks, basket weave checker bricks and the like) stacked in multiple off-set courses to form a honeycomb structure thereof, the checker bricks in the module being bonded to one another by a bonding agent.

15 Claims, 19 Drawing Sheets

Figure 1:
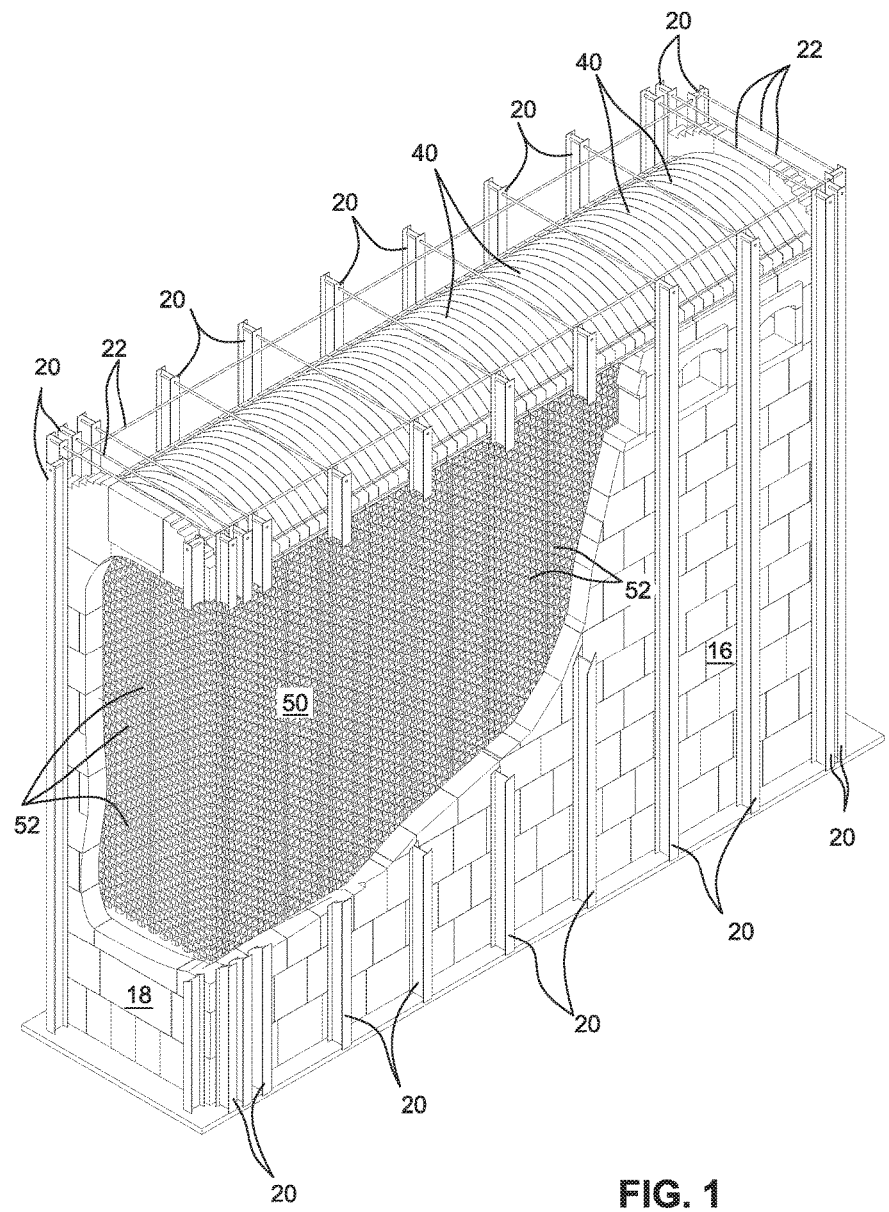

(51) Int. Cl.
*F27D 1/00* (2006.01)
*F27D 1/04* (2006.01)
*F27D 1/06* (2006.01)

(56) References Cited

U.S. PATENT DOCUMENTS

| | | | | |
|---|---|---|---|---|
| 4,974,666 | A * | 12/1990 | Hirata | F28D 17/02 |
| | | | | 165/9.1 |
| 5,634,313 | A * | 6/1997 | Mogling | C03B 5/237 |
| | | | | 165/9.1 |
| 2004/0244944 | A1* | 12/2004 | Bald | F27D 1/042 |
| | | | | 165/9.1 |
| 2006/0272264 | A1* | 12/2006 | Parker | E04B 2/06 |
| | | | | 52/605 |

FOREIGN PATENT DOCUMENTS

| | | |
|---|---|---|
| JP | 3255684 | 11/2001 |
| JP | 2004-093242 | 10/2004 |
| WO | WO 2011/013069 | 2/2011 |

* cited by examiner

INTEGRAL SELF-SUPPORTING REFRACTORY CHECKER BRICK MODULES FOR GLASS FURNACE REGENERATOR STRUCTURES, AND METHODS OF FORMING SAME

CROSS-REFERENCE TO RELATED APPLICATIONS

This application is based on and claims domestic priority benefits under 35 USC § 119(e) from U.S. Provisional Application Ser. No. 62/111,460 filed on Feb. 3, 2015 and also claims foreign priority benefits under 35 USC § 119(a) from GB 1503141.2 filed on Feb. 25, 2015, the entire contents of each such prior filed application being expressly incorporated hereinto by reference.

FIELD

The embodiments disclosed herein relate generally to integral self-supporting refractory checker brick modules that may be assembled to form a checker pack of a glass furnace regenerator structure. According to some embodiments, the modules are formed of multiple refractory tubular checker bricks integrally bonded together to provide the integral self-supporting refractory checker brick module. The modules may be assembled in within the regenerator structure to form the checker pack therewithin.

BACKGROUND

In the manufacturing process for making glass, raw materials including sand, lime, soda ash and other ingredients are fed into a furnace, sometimes called a glass tank. The raw materials are subjected to temperature above about 2,800° F. in the glass furnace which causes the raw materials to melt and thereby form a molten bed of glass that exits the glass furnace for further downstream processing into glass products.

The most common way of heating the glass furnace is through the combustion of a hydrocarbon fuel source, such as natural gas or oil. The hydrocarbon fuel is mixed with combustion air inside the furnace and combusted to thereby transfer the combustion heat energy to the raw materials and glass melt prior to exiting the furnace.

In order to improve the thermal efficiency of the combustion process, the combustion air used to combust the fuel is preheated by means of regenerator structures. More specifically, a supply of combustion air is preheated in a honeycombed pack of checker bricks contained within the interior of the regenerator structure. More specifically, fresh combustion air is drawn up through the pack of heated checker bricks in the regenerator structure and preheated by means of heat transfer. The pre-heated combustion air may then be mixed with the fuel, combusted. Waste combustion gas exits the glass furnace and passes through a second regenerator structure. As the waste gasses pass through the second regenerator the checker bricks in the pack are heated by means of heat transferred from the waste gas. After a predetermined time has elapsed (e.g., after about 15-30 minutes), the process cycle is reversed so that the checker bricks in one of the regenerator structures that were being heated by heat transfer with the waste gas are then used to preheat the fresh combustion air while the checker bricks in the other regenerator structures that were used to preheat the combustion air are then re-heated by heat transfer with the waste combustion gas. See in this regard, U.S. Pat. No. 3,326,541 (the entire content of which is expressly incorporated hereinto by reference).

The checker bricks used in in the packs of glass furnace regenerator structures need to be replaced near or at the end of their useful life in order to maintain optimal production efficiencies. It is currently difficult to replace the checker bricks when it may be desired for them to be replaced. Moreover, the current techniques for installing and/or replacing the individual checker bricks within a glass furnace regenerator structure is very labor intensive, possibly taking many weeks as it requires the placement of literally thousands of checker bricks to form the pack.

It can be appreciated therefore, that if the checker bricks of the regenerator structure could be prefabricated into self-supporting modules, then the furnace down time required for the replacement and/or installation of the checker brick pack could be substantially decreased. It is towards providing such improvements that the embodiments of the present invention are directed.

SUMMARY

In general, the embodiments disclosed herein are directed toward self-supporting refractory checker brick modules for glass furnace regenerators comprising multiple preformed refractory checker bricks stacked in multiple off-set courses to form a honeycomb structure thereof, wherein the checker bricks in the module are bonded to one another by a bonding agent. According to some embodiments, the pre-formed checker bricks are substantially square tubular parallelepipeds formed of a cured refractory material, but other tubular geometries may be satisfactorily employed. The pre-formed checker bricks are pressed or cast.

The bonding agent bonding the checker bricks to one another may be a sacrificial or non-sacrificial bonding agent. According to certain embodiments, the bonding agent is an epoxy adhesive bonding agent.

The module may include at least one side edge formed of off-set longitudinally split checker bricks. In other embodiments, the module includes opposed one side edges and an end edge formed of offset set longitudinally split checker bricks. The longitudinally split checker bricks may be longitudinally bisected by a substantially vertical plane.

Certain embodiments of the module will comprise four courses of the off-set checker bricks. Each course may comprise a matrix of 2×2 checker bricks, 2×3 checker bricks or 3×3 checker bricks off-set relative to one another in the length and width dimensions. Other matrix configurations of off-set checker bricks in the courses may be employed.

These and other aspects and advantages of the present invention will become more clear after careful consideration is given to the following detailed description of the preferred exemplary embodiments thereof.

BRIEF DESCRIPTION OF ACCOMPANYING DRAWINGS

Figure 2:
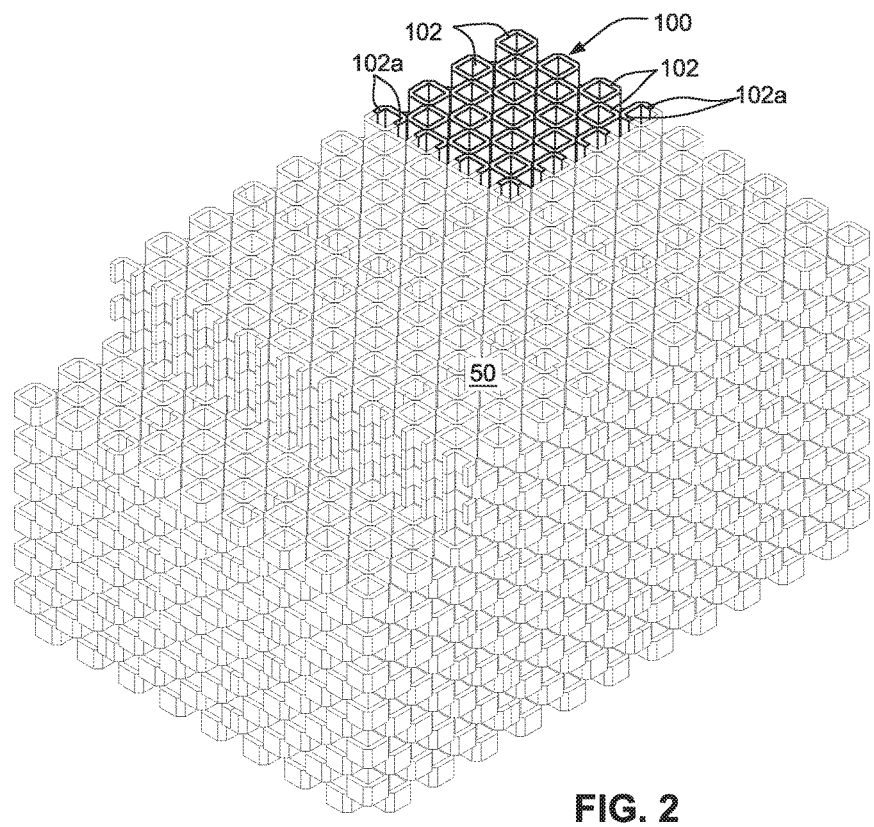
Figure 3:
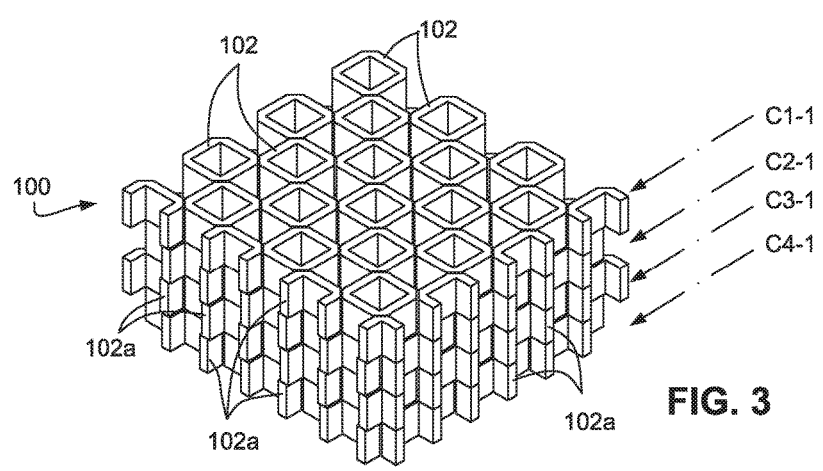
Figure 4:
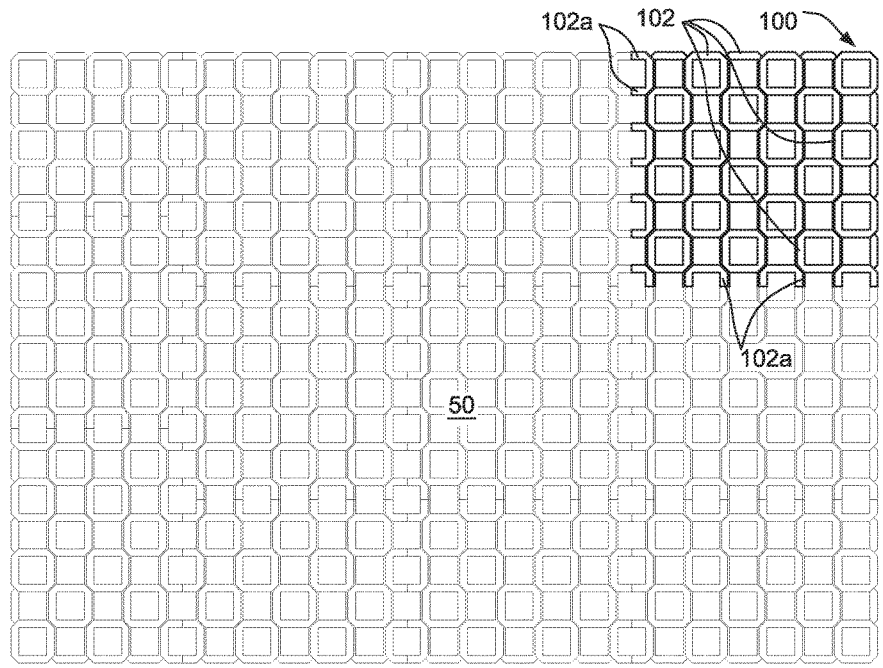
Figure 5:
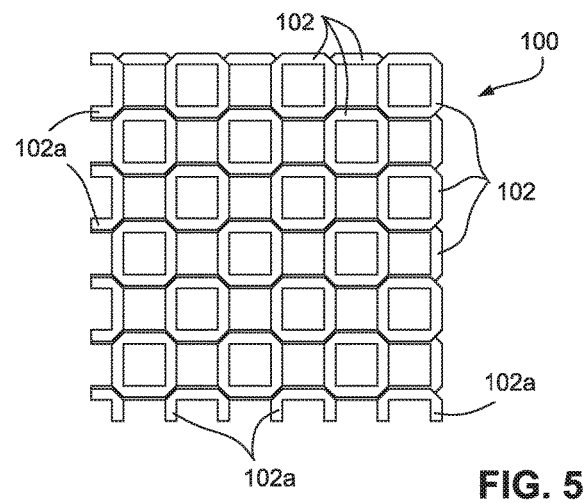
Figure 6:
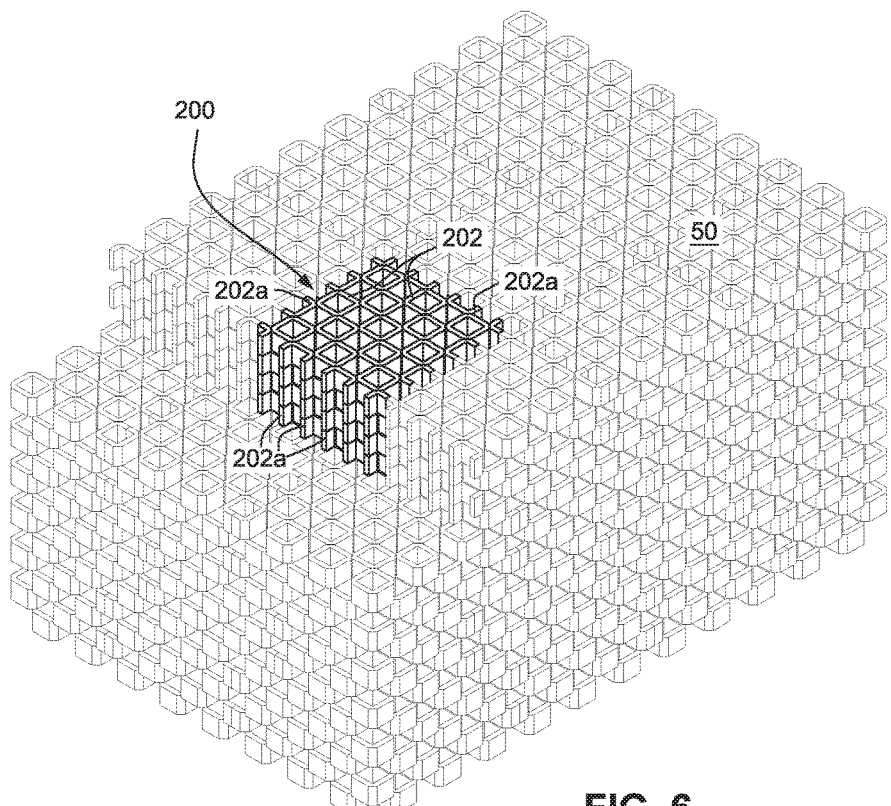
Figure 7:
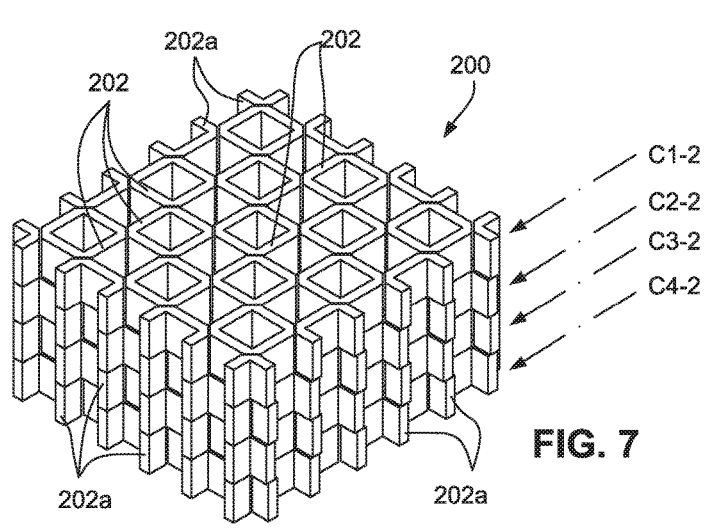
Figure 8:
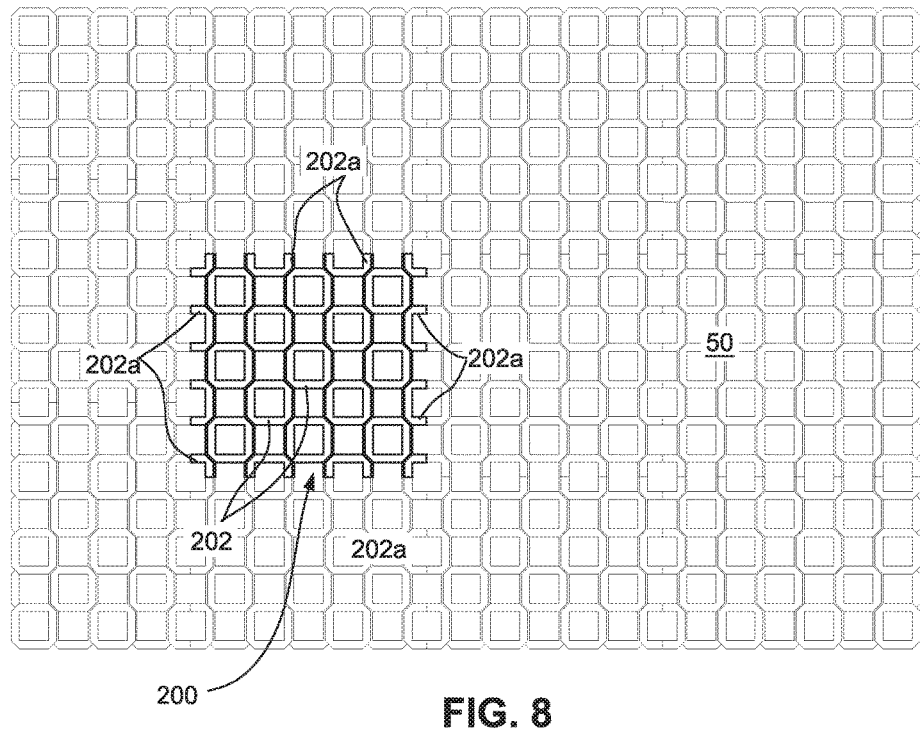
Figure 9:
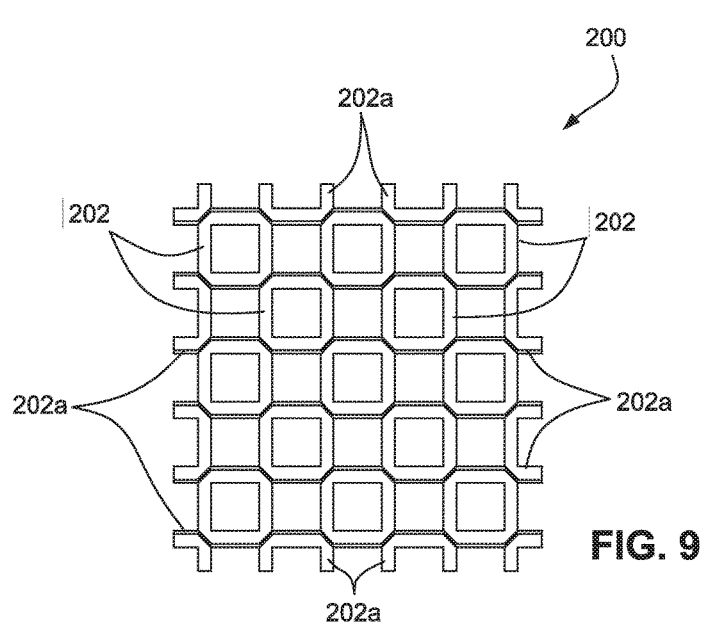
Figure 10:
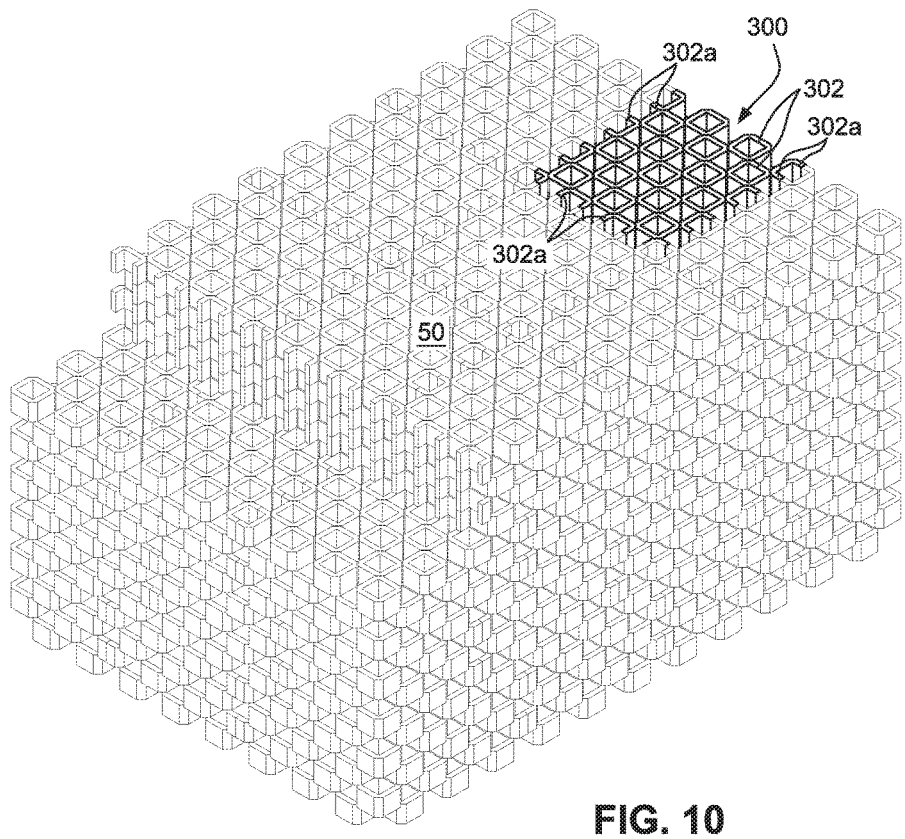
Figure 11:
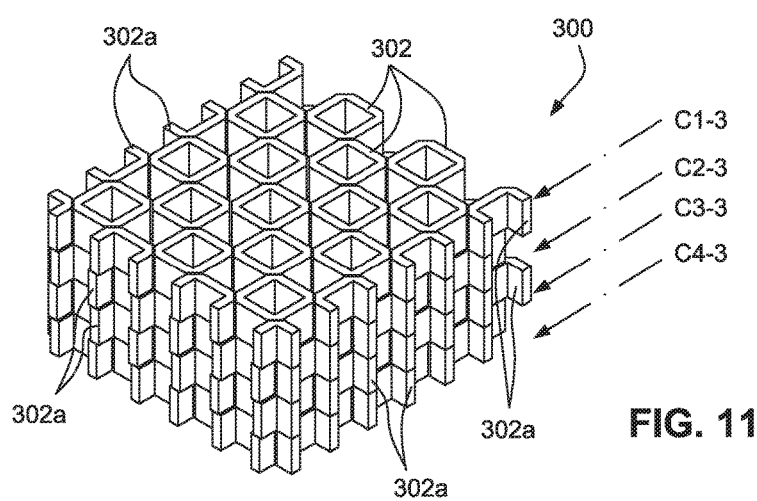
Figure 12:
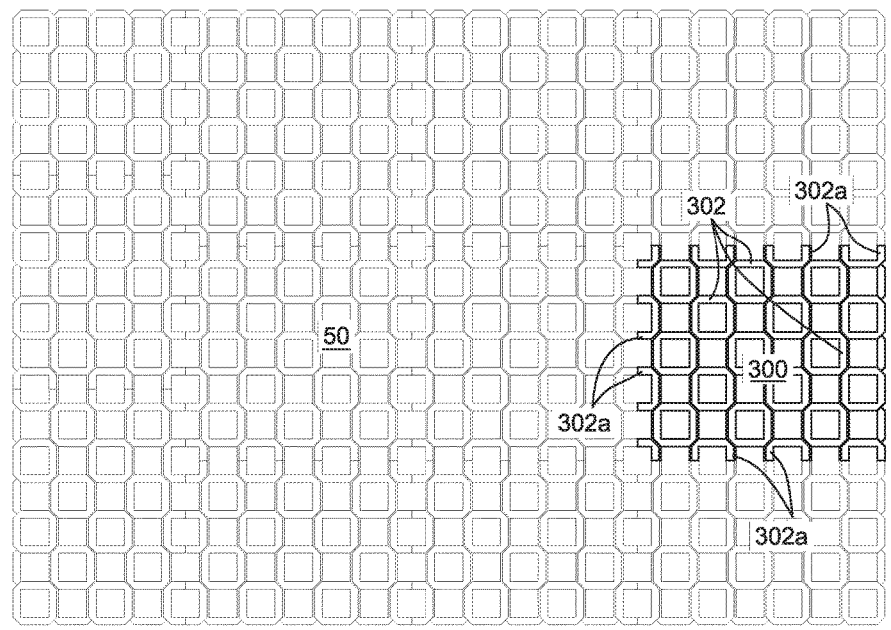
Figure 13:
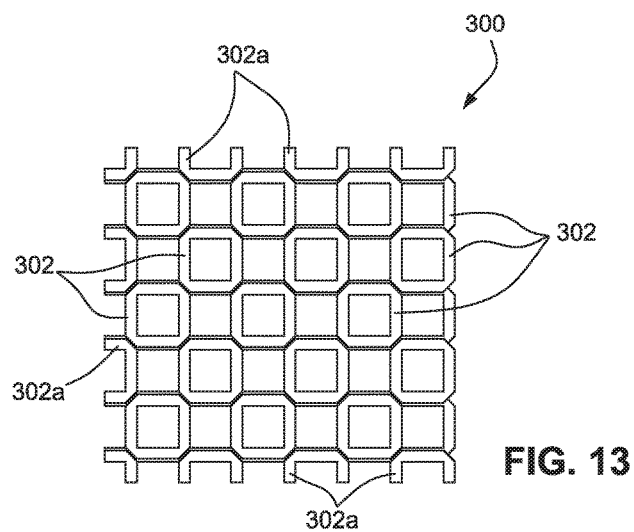
Figure 14:
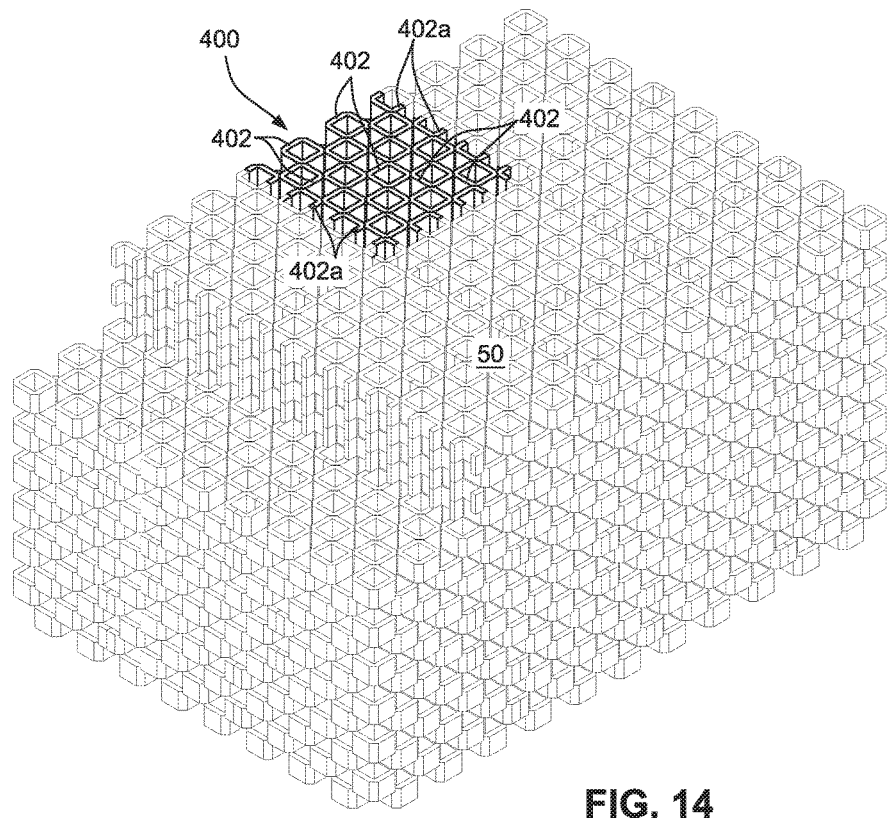
Figure 15:
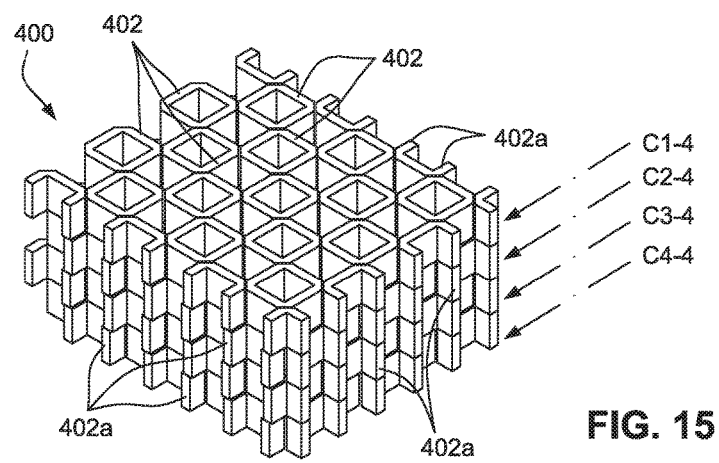
Figure 16:
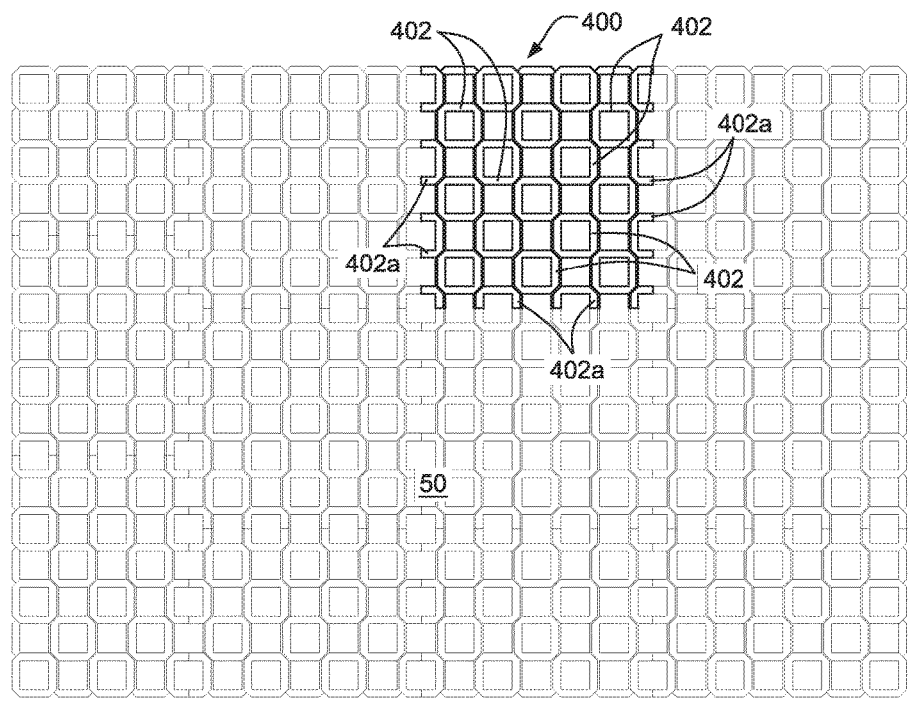
Figure 17:
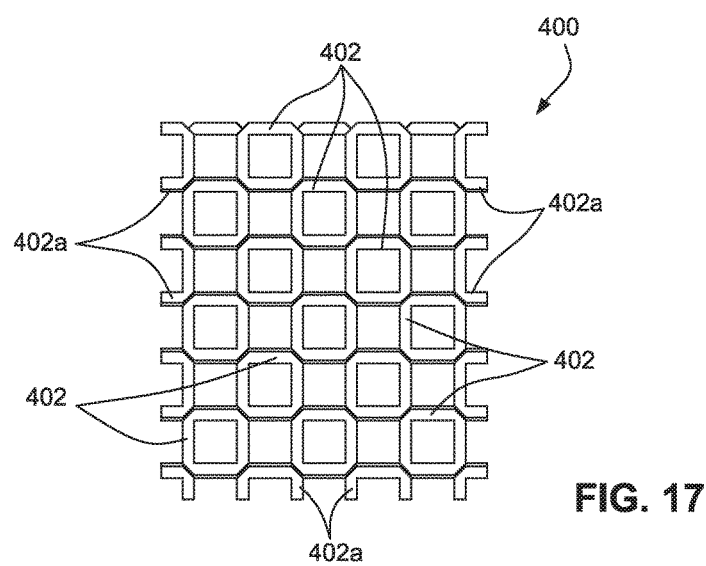
Figure 18:
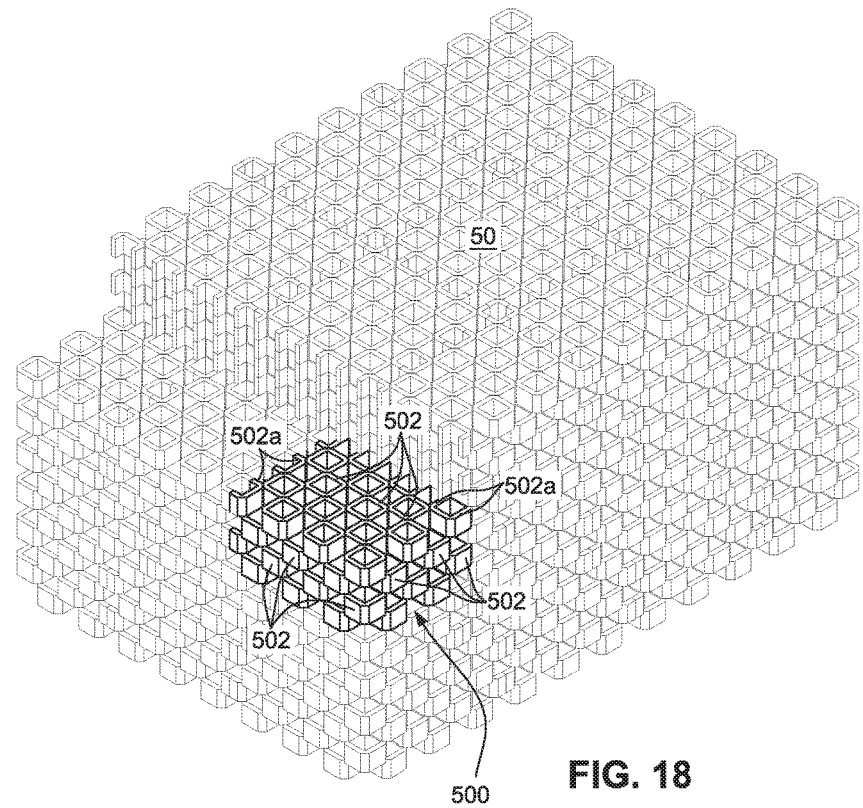
Figure 19:
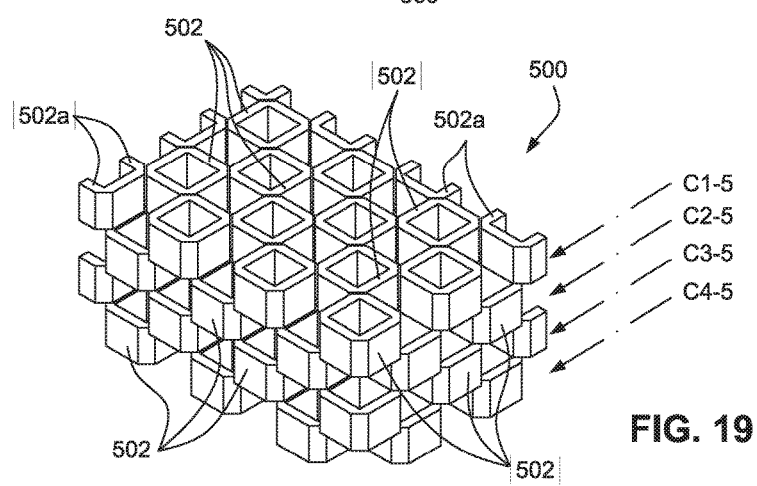
Figure 20:
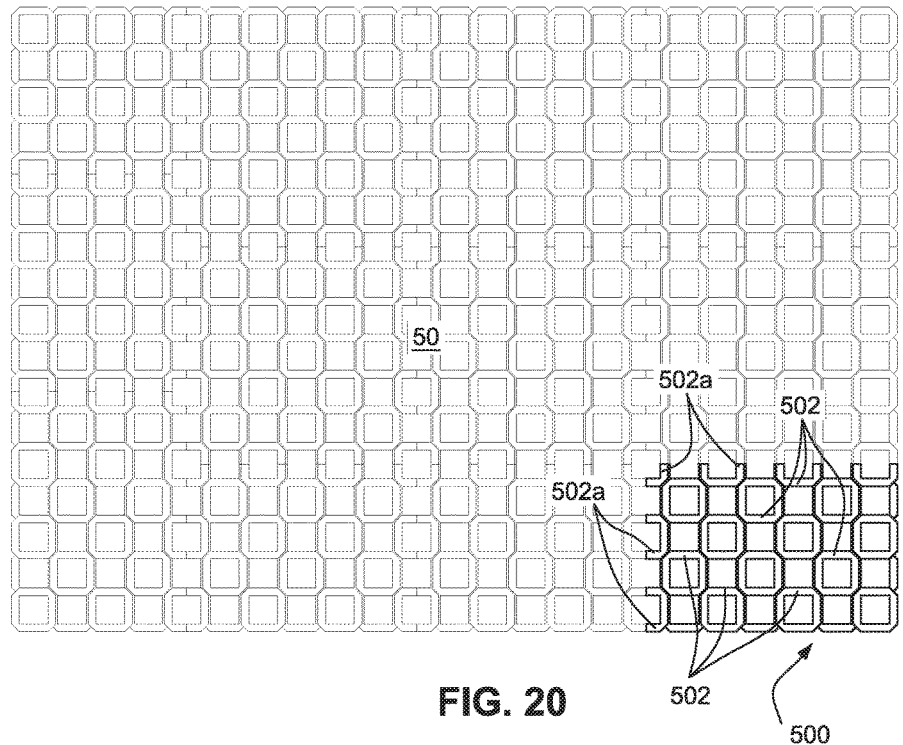
Figure 21:
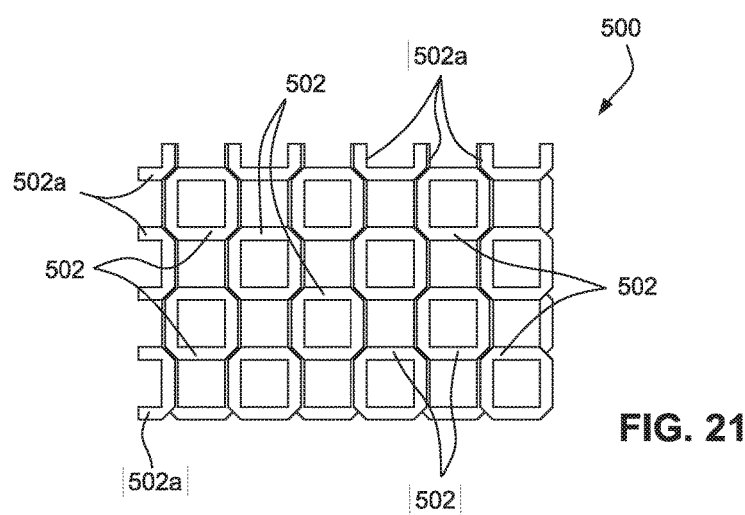
Figure 22:
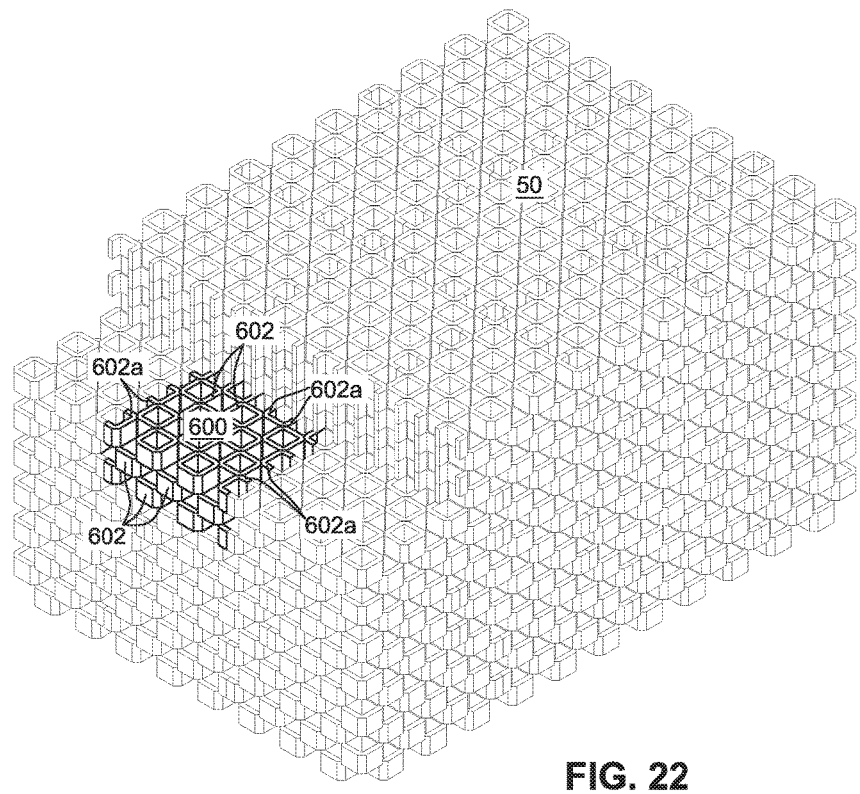
Figure 23:
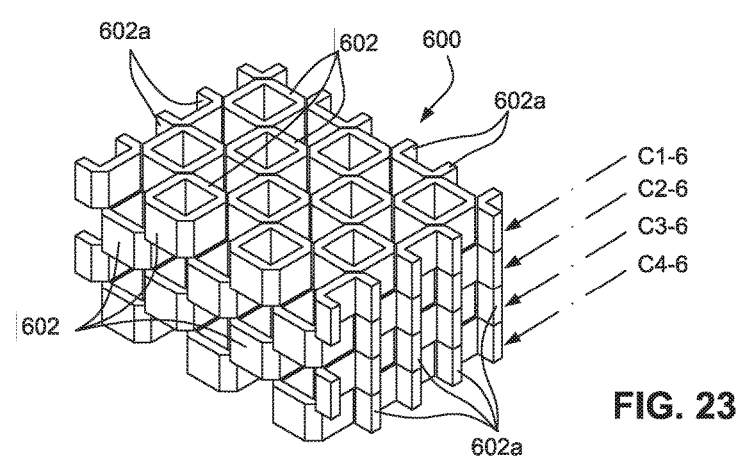
Figure 24:
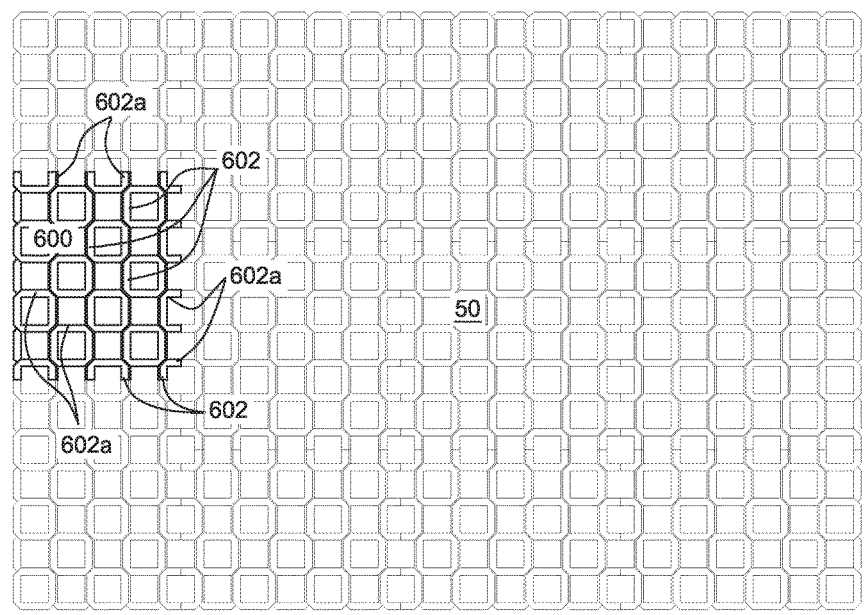
Figure 25:
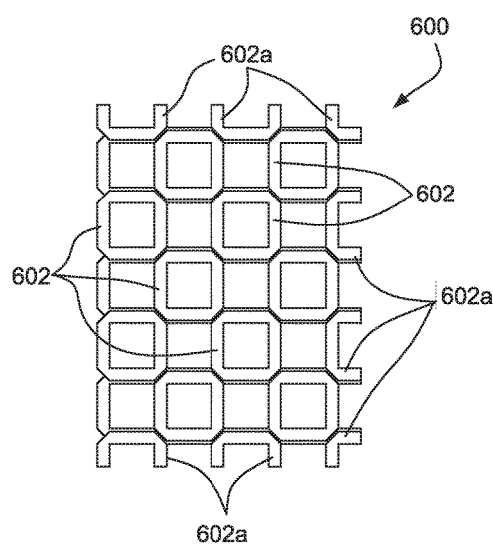
Figure 26:
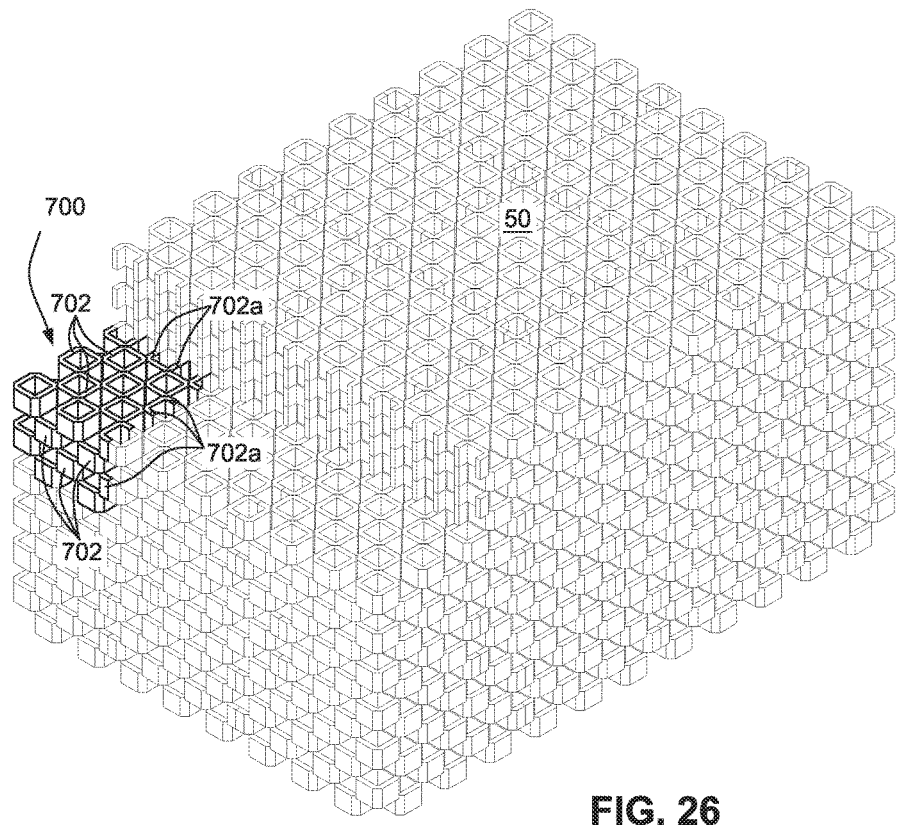
Figure 27:
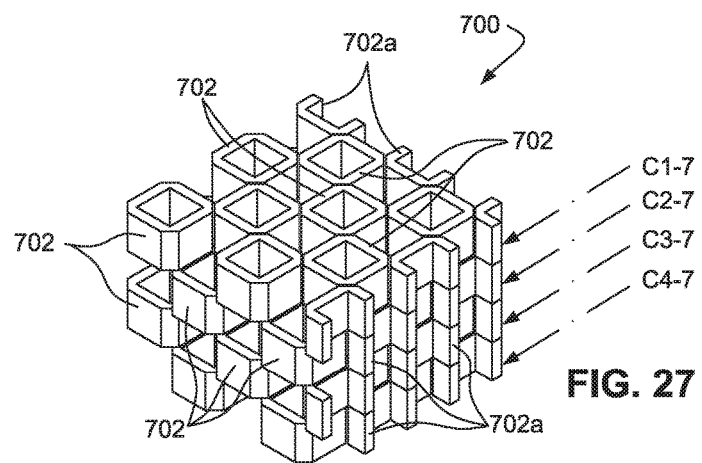
Figure 28:
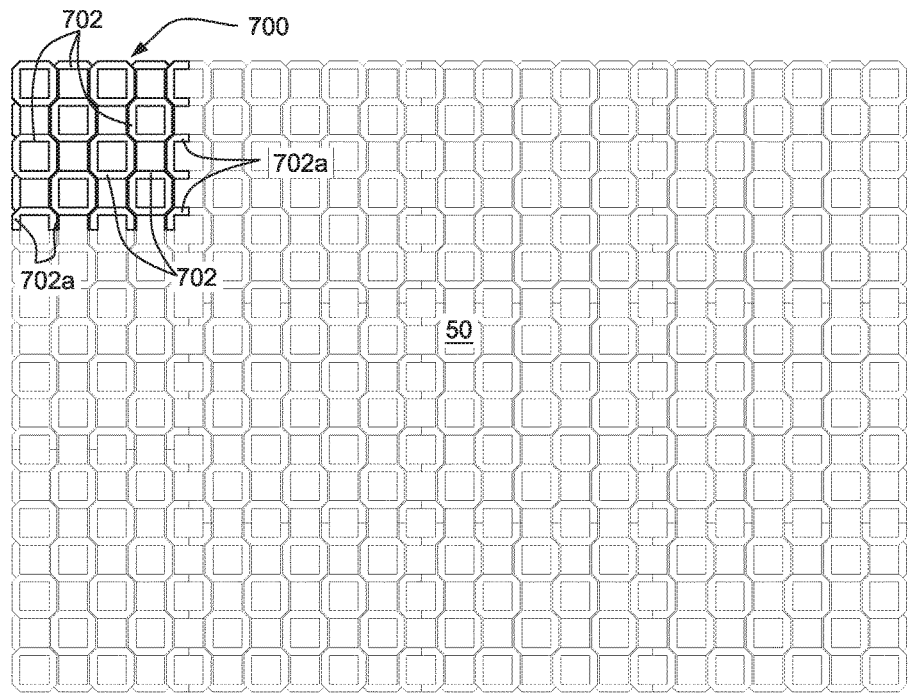
Figure 29:
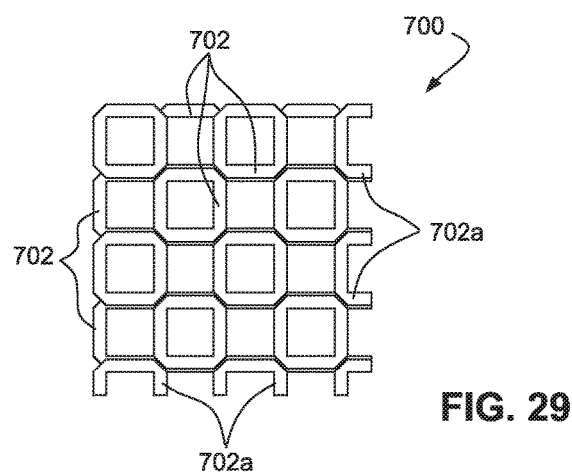
Figure 30:
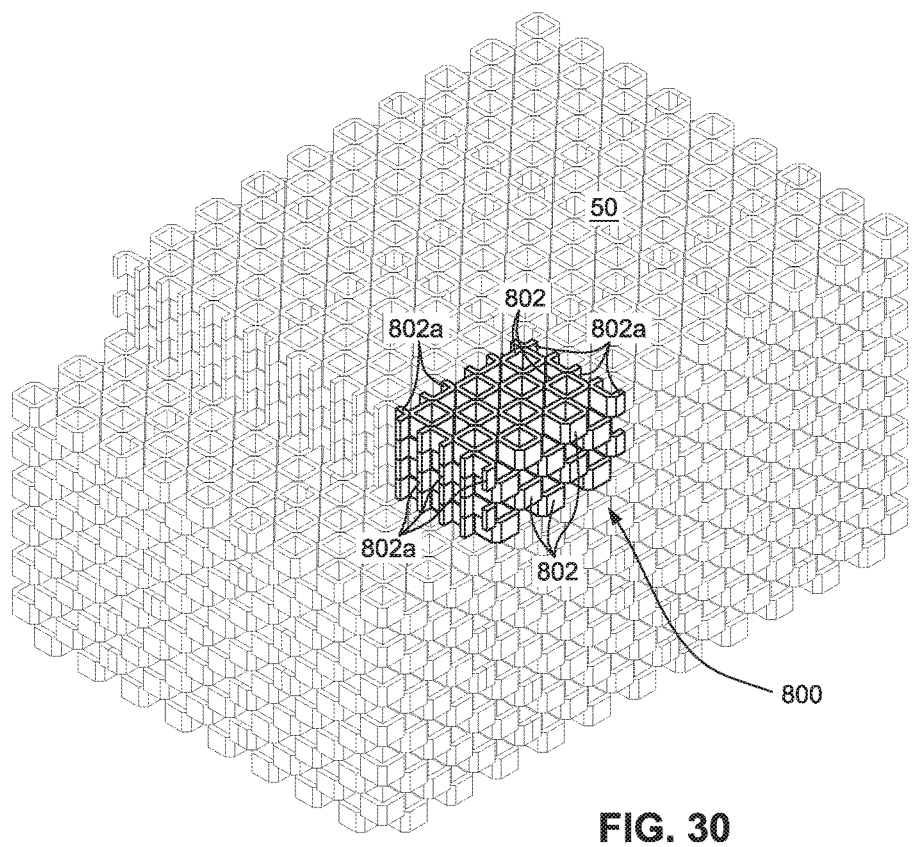
Figure 31:
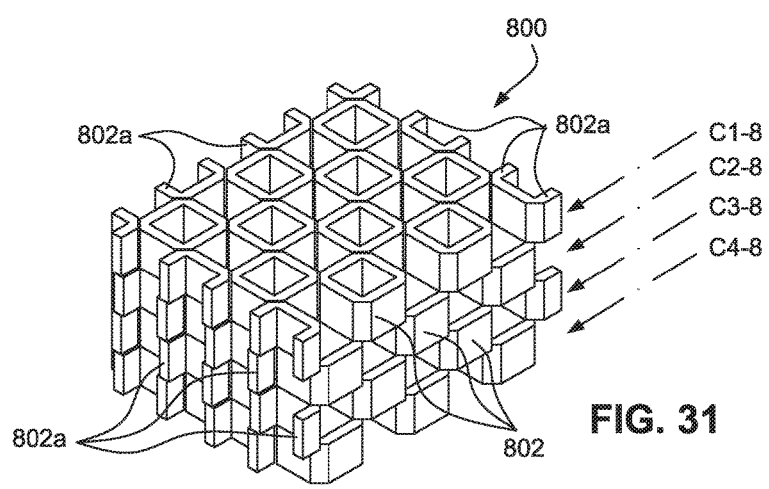
Figure 32:
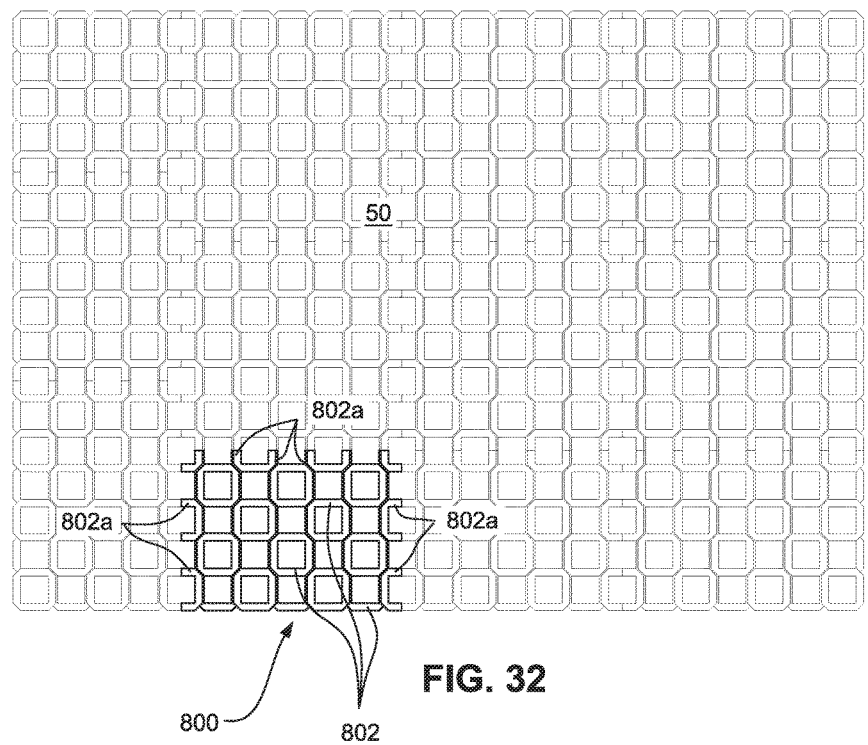
Figure 33:
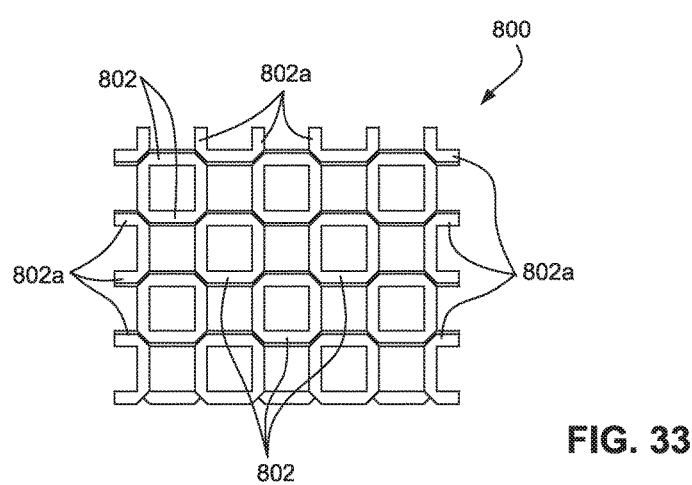
Figure 34:
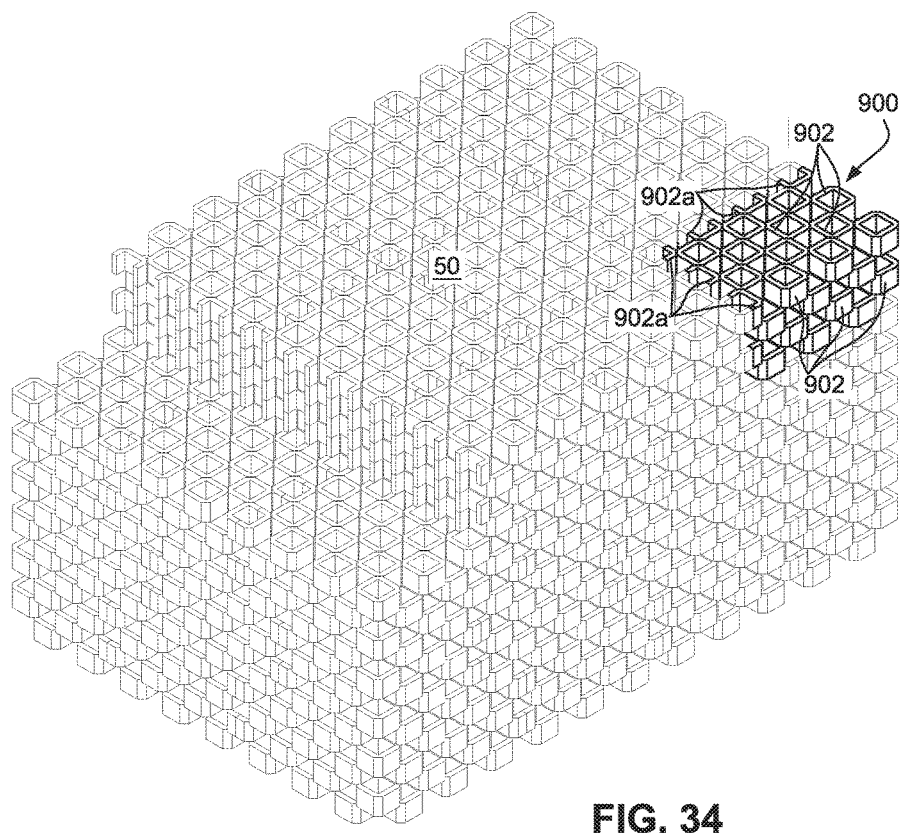
Figure 35:
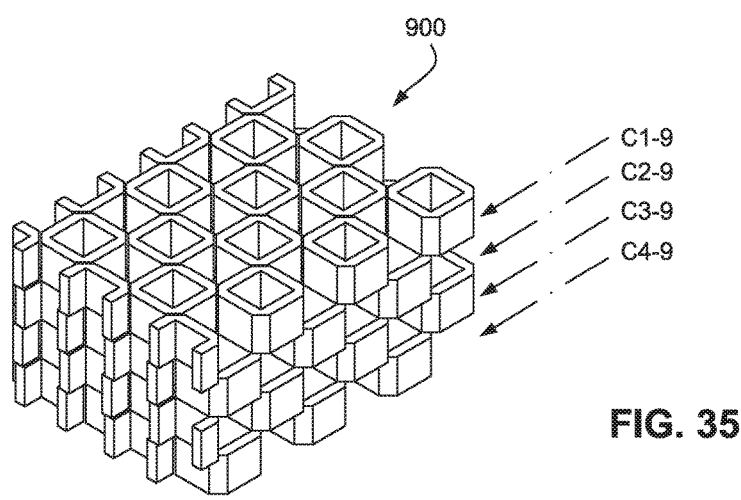
Figure 36:
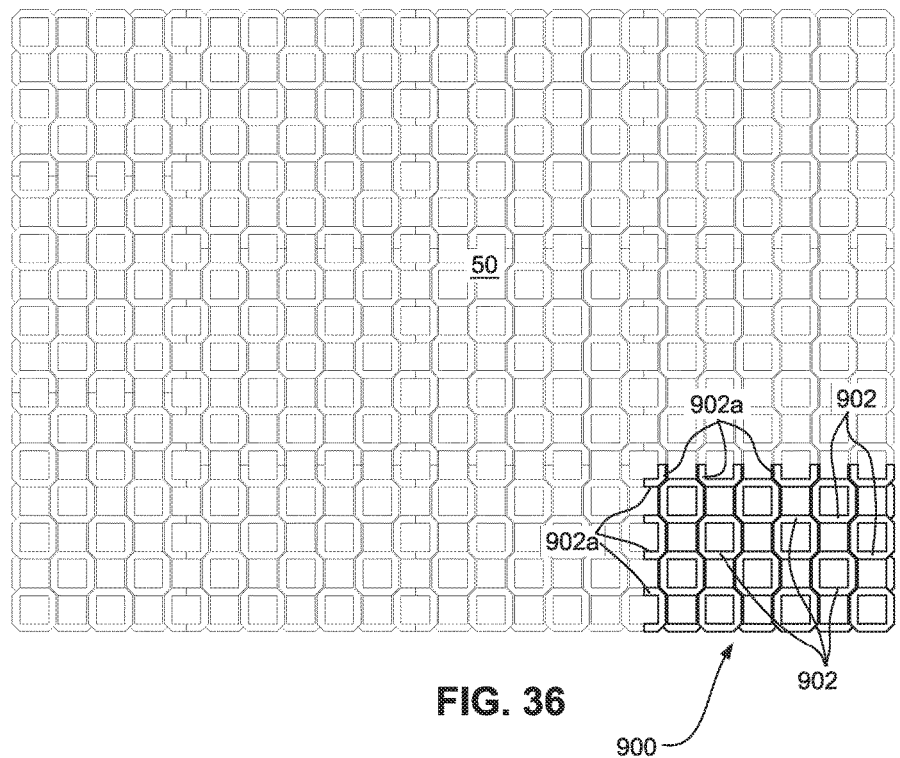
Figure 37:
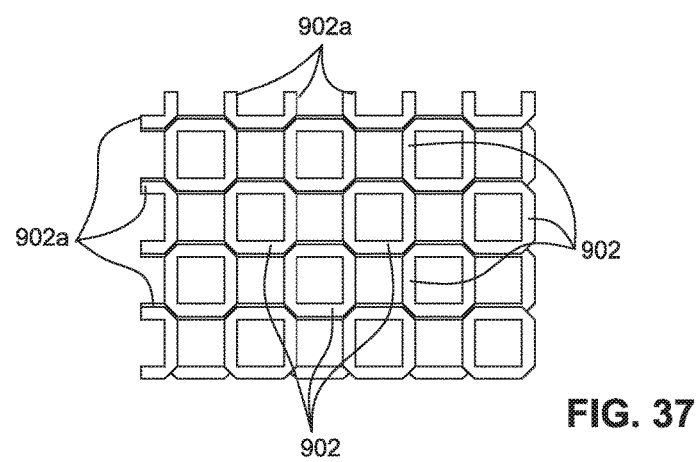

The disclosed embodiments of the present invention will be better and more completely understood by referring to the following detailed description of exemplary non-limiting illustrative embodiments in conjunction with the drawings of which:

FIG. 1 is a perspective view of a glass furnace regenerator structure with walls thereof partly exposed showing an assembly of refractory checker brick modules in accordance with embodiments of the present invention to form the checker brick pack therewithin;

FIGS. 2-5 depict an embodiment of a corner module of checker bricks, wherein FIG. 2 is a perspective view of a partial checker brick pack showing in bold line the location of the corner module, FIG. 3 is a perspective view of the corner module removed from the checker brick pack, FIG. 4 is a top plan view of the partial checker brick pack showing in bold line the location of the corner module and FIG. 5 is a top plan view of the corner module;

FIGS. 6-9 depict an embodiment of an interior module of checker bricks, wherein FIG. 6 is a perspective view of a partial checker brick pack showing in bold line the location of the interior module, FIG. 7 is a perspective view of the interior module removed from the checker brick pack, FIG. 8 is a top plan view of the partial checker brick pack showing in bold line the location of the interior module and FIG. 9 is a top plan view of the interior module;

FIGS. 10-13 depict an embodiment of a latitudinal edge module of checker bricks, wherein FIG. 10 is a perspective view of a partial checker brick pack showing in bold line the location of the latitudinal edge module, FIG. 11 is a perspective view of the latitudinal edge module removed from the checker brick pack, FIG. 12 is a top plan view of the partial checker brick pack showing in bold line the location of the latitudinal edge module and FIG. 13 is a top plan view of the latitudinal edge module;

FIGS. 14-17 depict an embodiment of a longitudinal edge module of checker bricks, wherein FIG. 14 is a perspective view of a partial checker brick pack showing in bold line the location of the longitudinal edge module, FIG. 15 is a perspective view of the longitudinal edge module removed from the checker brick pack, FIG. 16 is a top plan view of the partial checker brick pack showing in bold line the location of the longitudinal edge module and FIG. 17 is a top plan view of the longitudinal edge module;

FIGS. 18-21 depict another embodiment of a corner module of checker bricks, wherein FIG. 18 is a perspective view of a partial checker brick pack showing in bold line the location of the corner module, FIG. 19 is a perspective view of the corner module removed from the checker brick pack, FIG. 20 is a top plan view of the partial checker brick pack showing in bold line the location of the corner module and FIG. 21 is a top plan view of the corner module;

FIGS. 22-25 depict another embodiment of a latitudinal edge module of checker bricks, wherein FIG. 22 is a perspective view of a partial checker brick pack showing in bold line the location of the latitudinal edge module, FIG. 23 is a perspective view of the latitudinal edge module removed from the checker brick pack, FIG. 24 is a top plan view of the partial checker brick pack showing in bold line the location of the latitudinal edge module and FIG. 25 is a top plan view of the latitudinal edge module;

FIGS. 26-29 depict yet another embodiment of a corner module of checker bricks, wherein FIG. 26 is a perspective view of a partial checker brick pack showing in bold line the location of the corner module, FIG. 27 is a perspective view of the corner module removed from the checker brick pack, FIG. 28 is a top plan view of the partial checker brick pack showing in bold line the location of the corner module and FIG. 29 is a top plan view of the corner module;

FIGS. 30-33 depict another embodiment of a longitudinal edge module of checker bricks, wherein FIG. 30 is a perspective view of a partial checker brick pack showing in bold line the location of the longitudinal edge module, FIG. 31 is a perspective view of the longitudinal edge module removed from the checker brick pack, FIG. 32 is a top plan view of the partial checker brick pack showing in bold line the location of the longitudinal edge module and FIG. 33 is a top plan view of the longitudinal edge module; and FIGS. 34-37 depict yet another embodiment of a corner module of checker bricks, wherein FIG. 34 is a perspective view of a partial checker brick pack showing in bold line the location of the corner module, FIG. 35 is a perspective view of the corner module removed from the checker brick pack, FIG. 36 is a top plan view of the partial checker brick pack showing in bold line the location of the corner module and FIG. 37 is a top plan view of the corner module.

DETAILED DESCRIPTION

Accompanying FIG. 1 schematically depicts a perspective view of a regenerator structure 10 constructed of integral self-supporting composite refractory modules to be described in greater detail below that may be assembled to form side and/or end walls 16, 18 thereof. It will be appreciated that the regenerator structure 10 is used in operative combination with a glass furnace (not shown). The regenerator structure 10 generally depicted in the accompanying FIG. 1 is of a type used for side-fired glass furnaces. However, the attributes of the embodiments of the invention to be described herein are equally applicable to other glass furnace designs, e.g. end-fired glass furnaces, as well as to other refractory structures that employ checker brick packs and thus may benefit from the advantages of the embodiments of the invention.

The top portion of the regenerator structure 10 is capped with a series of adjacently positioned crowns (a representative few of which are noted by reference numeral 40). The walls 16, 18 are structurally supported by external upright structural beams known colloquially as buck stays 20. As is known in the art, the buck stays 20 are compressively held against the walls 16, 18 by means of tie rods 22 extending between and interconnecting opposed pairs of buck stays 20 both latitudinally and longitudinally relative to the regenerator structure 10.

The bottom portion of the regenerator structure includes adjacently positioned rider arches (not shown). The rider arches are thus provided to establish a channel for the ingress/egress of combustion air and gases to/from the regenerator structure 10 and to provide a supporting floor for the checker brick pack 50 occupying the interior volume of the regenerator structure 10 thereabove. As is known, the individual checker bricks (a representative few of which are identified in the accompanying FIGURES by reference numeral 52) are elongate tubular structures (e.g., square tubular structures in cross-section) stacked in an off-set staggered manner so as to provide a generally honeycomb arrangement to provide a tortuous path through which the glass furnace gases flow for heat-exchange therewith.

In accordance with the embodiments of the invention, the checker brick pack 50 is formed of an assembled stack of modules, each module being a self-supporting structure formed by multiple courses of individually stacked tubular (e.g., square parallel piped) checker bricks such that the checker bricks in one course are off-set or staggered as compared to the checker bricks in an adjacent course.

According to the embodiments disclosed herein, the checker bricks forming the modules are preferably bonded to one another by a suitable sacrificial or non-sacrificial bonding agent, such as an epoxy adhesive bonding agent. By the term "sacrificial bonding agent" is meant to refer to bonding agents that allow the checker bricks to be bonded to one another so that the assembly of interbonded checker bricks forms an integral self-supporting transportable refractory checker brick module, but which are consumed or combusted in the high heat (e.g., temperatures of about 1100° C. to about 1650° C.) during use of the regenerator structure 10 in which the component is installed. The individual checker bricks forming the modules will therefore remain intact when the sacrificial bonding agent is consumed or combusted and will remain in their stacked off-set relationship with checker bricks in adjacent courses. By the term "non-sacrificial bonding agent" is meant a bonding agent that remains intact and is not consumed or combusted at the high temperatures associated with the regenerator structure 10 in which the checker brick module is installed.

As noted above the preferred bonding agent is an epoxy adhesive bonding agent. As noted previously, the epoxy bonding agent may be sacrificial or non-sacrificial.

An embodiment of a corner module 100 of checker bricks (a few of which are identified by reference numeral 102) that may be employed in the checker brick pack 50 is depicted in accompanying FIGS. 2-5. As shown, for example, by FIG. 3, the module 100 is comprised of multiple courses C1-1 through C4-1 each including multiple spaced-apart tubular (e.g., square parallelepiped) checker bricks 102. The checker bricks 102 in each of the courses C1-1 through C4-1 are off-set in a staggered arrangement relative to the checker bricks 102 in an adjacent one of the courses C1-1 through C4-1.

The checker bricks forming the interior edges of the module 100 relative to the checker brick pack 50 (a representative few of which are identified by reference numerals 102*a*) are split lengthwise along a vertical plane. Preferably, the checker bricks 102*a* will be bisected longitudinally along a vertical plane so as form respective exposed edges that are aligned with similar exposed edges of an adjacent module in the pack 50. In the case of the corner module 100, therefore, the exposed edges of the split checker bricks 102*a* will mate with respective exposed edges of the split checker bricks of modules 300 and 400 as described below in relation to FIGS. 10-17, respectively.

The module 100 depicted in FIGS. 2-5 is a 3×3 module in that each of the courses C1-1 through C4-1 is formed of an offset matrix of three checker bricks 102 in each of its length and width dimensions, exclusive of the edge checker bricks 102*a*.

An embodiment of an interior module 200 of checker bricks (a few of which are identified by reference numeral 202) that may be employed in the checker brick pack 50 is depicted in accompanying FIGS. 6-9. As shown, for example, by FIG. 7, the module 200 is comprised of multiple courses C1-2 through C4-2 each including multiple spaced-apart tubular (e.g., square parallelepiped) checker bricks 202. The checker bricks 202 in each of the courses C1-2 through C4-2 are off-set in a staggered arrangement relative to the checker bricks 202 in an adjacent one of the courses C1-2 through C4-2.

As shown in FIGS. 6-9, the interior module 200 includes opposed sides defined by checker bricks which are split lengthwise along a vertical plane (a representative few of which are identified by reference numerals 202*a*) thereby forming interior edges of the module 200. Preferably, the checker bricks 202*a* will be bisected longitudinally along a vertical plane so as form respective exposed edges that are aligned with similar exposed edges of an adjacent module in the pack 50. In the case of the interior module 200, therefore, the exposed edges of the split checker bricks 102*a* will mate with respective exposed edges of the split checker bricks of a similar interior module 200 adjacently positioned in the stack 50 or with one of the side modules 400, 800 as described below in relation to FIGS. 14-17 and FIGS. 30-33, respectively.

The module 200 depicted in FIGS. 6-9 is a 3×3 module in that each of the courses C1-2 through C4-2 is formed of an offset matrix of three checker bricks 202 in each of its length and width dimensions, exclusive of the edge checker bricks 202*a*.

An embodiment of a latitudinal edge module 300 of checker bricks (a few of which are identified by reference numeral 302) that may be employed in the checker brick pack 50 is depicted in accompanying FIGS. 10-13. As shown, for example, by FIG. 11, the module 300 is comprised of multiple courses C1-3 through C4-3 each including multiple spaced-apart tubular (e.g., square parallelepiped) checker bricks 302. The checker bricks 302 in each of the courses C1-3 through C4-3 are offset in a staggered arrangement relative to the checker bricks 302 in an adjacent one of the courses C1-3 through C4-3.

As shown in FIGS. 10-13, the latitudinal edge module 300 includes an interior end side and opposed lateral sides defined by checker bricks which are split lengthwise along a vertical plane (a representative few of which are identified by reference numerals 302*a*) thereby forming interior edges of the module 300. Preferably, the checker bricks 302*a* will be bisected longitudinally along a vertical plane so as form respective exposed edges that are aligned with similar exposed edges of an adjacent module in the pack 50. In the case of the latitudinal edge module 300, therefore, the exposed edges of the split checker bricks 302*a* will mate with respective exposed edges of the split checker bricks of an end module 100, an interior module 200 as described above in relation to FIGS. 2-5 and FIGS. 6-9 or a corner module 500 as described below in relation to FIGS. 18-21, respectively.

The module 300 depicted in FIGS. 10-13 is a 3×3 module in that each of the courses C1-3 through C4-3 is formed of an offset matrix of three checker bricks 302 in each of its length and width dimensions, exclusive of the edge checker bricks 302*a*.

An embodiment of a longitudinal edge module 400 of checker bricks (a few of which are identified by reference numeral 402) that may be employed in the checker brick pack 50 is depicted in accompanying FIGS. 14-17. As shown, for example, by FIG. 15, the module 400 is comprised of multiple courses C1-4 through C4-4 each including multiple spaced-apart tubular (e.g., square parallelepiped) checker bricks 402. The checker bricks 402 in each of the courses C1-4 through C4-4 are off-set in a staggered arrangement relative to the checker bricks 402 in an adjacent one of the courses C1-4 through C4-4.

As shown in FIGS. 14-17, the longitudinal edge module 400 includes an interior end side and opposed lateral sides defined by checker bricks which are split lengthwise along a vertical plane (a representative few of which are identified by reference numerals 402*a*) thereby forming interior edges of the module 400. Preferably, the checker bricks 402*a* will be bisected longitudinally along a vertical plane so as form respective exposed edges that are aligned with similar exposed edges of an adjacent module in the pack 50. In the case of the latitudinal edge module 400, therefore, the exposed edges of the split checker bricks 402*a* will mate with respective exposed edges of a similar adjacent longitudinal edge module 400 or the split checker bricks of a corner module 100 or an interior module 200 as described above in relation to FIGS. 2-5 and FIGS. 6-9, respectively.

The module 400 depicted in FIGS. 14-17 is a 3×3 module in that each of the courses C1-4 through C4-4 is formed of an offset matrix of three checker bricks 402 in each of its length and width dimensions, exclusive of the edge checker bricks 402*a*.

Another embodiment of a corner module 500 of checker bricks (a few of which are identified by reference numeral 502) that may be employed in the checker brick pack 50 is depicted in accompanying FIGS. 18-21. As shown, for example, by FIG. 19, the module 500 is comprised of multiple courses C1-5 through C4-5 each including multiple spaced-apart tubular (e.g., square parallelepiped) checker bricks 502. The checker bricks 502 in each of the courses C1-5 through C4-5 are off-set in a staggered arrangement relative to the checker bricks 502 in an adjacent one of the courses C1-5 through C4-5.

As shown in FIGS. 18-21, the corner module 500 includes adjacent mutually orthogonal interior sides defined by checker bricks which are split lengthwise along a vertical plane (a representative few of which are identified by reference numerals 402a) thereby forming the interior edges of the module 500. Preferably, the checker bricks 502*a* will be bisected longitudinally along a vertical plane so as form respective exposed edges that are aligned with similar exposed edges of an adjacent module in the pack 50. In the case of the latitudinal edge module 500, therefore, the exposed edges of the split checker bricks 502*a* will mate with respective exposed edges of a latitudinal edge module 600 or a longitudinal edge module 800 as described below in relation to FIGS. 22-25 and FIGS. 31-33, respectively.

The module 500 depicted in FIGS. 18-21 is a 2×3 module in that each of the courses C1-5 through C4-5 is formed of an offset matrix of two checker bricks 502 in a width dimension and three checker bricks 502 in the length dimension, exclusive of the edge checker bricks 502*a*.

An embodiment of a latitudinal edge module 600 of checker bricks (a few of which are identified by reference numeral 602) that may be employed in the checker brick pack 50 is depicted in accompanying FIGS. 22-23. As shown, for example, by FIG. 23, the module 600 is comprised of multiple courses C1-6 through C4-6 each including multiple spaced-apart tubular (e.g., square parallelepiped) checker bricks 602. The checker bricks 602 in each of the courses C1-6 through C4-6 are offset in a staggered arrangement relative to the checker bricks 602 in an adjacent one of the courses C1-6 through C4-6.

As shown in FIGS. 22-25, the latitudinal edge module 600 includes an interior end side and opposed lateral sides defined by checker bricks which are split lengthwise along a vertical plane (a representative few of which are identified by reference numerals 602*a*) thereby forming interior edges of the module 600. Preferably, the checker bricks 602*a* will be bisected longitudinally along a vertical plane so as form respective exposed edges that are aligned with similar exposed edges of an adjacent module in the pack 50. In the case of the latitudinal edge module 600, therefore, the exposed edges of the split checker bricks 602*a* will mate with respective exposed edges of the split checker bricks of an interior module 200 and a corner module 500 as described above in relation to FIGS. 6-9 and FIGS. 18-21, respectively, as well as a corner module 700 as described below in relation to FIGS. 26-29, respectively.

The module 600 depicted in FIGS. 22-25 is a 2×3 module in that each of the courses C1-6 through C4-6 is formed of an offset matrix of two checker bricks 602 in a width dimension and three checker bricks 602 in the length dimension, exclusive of the edge checker bricks 602*a*.

Another embodiment of a corner module 700 of checker bricks (a few of which are identified by reference numeral 702) that may be employed in the checker brick pack 50 is depicted in accompanying FIGS. 26-29. As shown, for example, by FIG. 26, the module 700 is comprised of multiple courses C1-7 through C4-7 each including multiple spaced-apart tubular (e.g., square parallelepiped) checker bricks 102. The checker bricks 702 in each of the courses C1-7 through C4-7 are offset in a staggered arrangement relative to the checker bricks 702 in an adjacent one of the courses C1-7 through C4-7.

The checker bricks forming the interior edges of the module 700 relative to the checker brick pack 50 (a representative few of which are identified by reference numerals 702*a*) are split lengthwise along a vertical plane. Preferably, the checker bricks 702*a* will be bisected longitudinally along a vertical plane so as form respective exposed edges that are aligned with similar exposed edges of an adjacent module in the pack 50. In the case of the corner module 700, therefore, the exposed edges of the split checker bricks 702*a* will mate with respective exposed edges of the split checker bricks of an adjacent longitudinal edge module 400 and a latitudinal edge module 600 as described above in relation to FIGS. 14-17 and FIGS. 22-25, respectively.

The module 700 depicted in FIGS. 27-29 is a 2×2 module in that each of the courses C1-7 through C4-7 is formed of an offset matrix of two checker bricks 702 in each of the width and length dimensions, exclusive of the edge checker bricks 702*a*.

Another embodiment of a longitudinal edge module 800 of checker bricks (a few of which are identified by reference numeral 802) that may be employed in the checker brick pack 50 is depicted in accompanying FIGS. 30-33. As shown, for example, by FIG. 31, the module 800 is comprised of multiple courses C1-8 through C4-8 each including multiple spaced-apart tubular (e.g., square parallelepiped) checker bricks 802. The checker bricks 802 in each of the courses C1-8 through C4-8 are off-set in a staggered arrangement relative to the checker bricks 802 in an adjacent one of the courses C1-8 through C4-8.

As shown in FIGS. 30-33, the longitudinal edge module 800 includes an interior end side and opposed lateral sides defined by checker bricks which are split lengthwise along a vertical plane (a representative few of which are identified by reference numerals 802*a*) thereby forming interior edges of the module 800. Preferably, the checker bricks 802*a* will be bisected longitudinally along a vertical plane so as form respective exposed edges that are aligned with similar exposed edges of an adjacent module in the pack 50. In the case of the latitudinal edge module 800, therefore, the exposed edges of the split checker bricks 802*a* will mate with respective exposed edges of a similar adjacent longitudinal edge module 800, the split checker bricks of an interior module 200 as described above in relation to FIGS. 6-9 or a corner module 900 as described below in relation to FIGS. 34-37.

The module 700 depicted in FIGS. 30-33 is a 2×2 module in that each of the courses C1-8 through C4-8 is formed of an offset matrix of two checker bricks 802 in each of the width and length dimensions, exclusive of the edge checker bricks 802*a*.

Yet another embodiment of a corner module 900 of checker bricks (a few of which are identified by reference numeral 902) that may be employed in the checker brick pack 50 is depicted in accompanying FIGS. 34-37. As shown, for example, by FIG. 35, the module 900 is comprised of multiple courses C1-9 through C4-9 each including multiple spaced-apart tubular (e.g., square parallelepiped) checker bricks 902. The checker bricks 902 in each of the courses C1-9 through C4-9 are offset in a staggered arrangement relative to the checker bricks 902 in an adjacent one of the courses C1-9 through C4-9.

The checker bricks forming the interior edges of the module 900 relative to the checker brick pack 50 (a representative few of which are identified by reference numerals 902a) are split lengthwise along a vertical plane. Preferably, the checker bricks 902a will be bisected longitudinally along a vertical plane so as form respective exposed edges that are aligned with similar exposed edges of an adjacent module in the pack 50. In the case of the corner module 900, therefore, the exposed edges of the split checker bricks 902a will mate with respective exposed edges of the split checker bricks of an adjacent latitudinal edge module 300 and a longitudinal edge module 800 as described above in relation to FIGS. 12-15 and FIGS. 34-37, respectively.

The module 900 depicted in FIGS. 34-37 is a 2×3 module in that each of the courses C1-9 through C4-9 is formed of an offset matrix of two checker bricks 902 in a width dimension and three checker bricks 902 in the length dimension, exclusive of the edge checker bricks 902a.

It will be appreciated that the modules 100-900 as described above may be oriented and assembled relative to one another to form a checker pack 50 of virtually any volumetric dimensions in terms of pack length, height and depth.

Although the individual checker bricks in the modules 100-900 have been shown and described in connection with a conventional OXIBAK™ tubular chimney-type of checker brick, other conventional checker bricks may alternatively be employed in the practice of this invention, such as conventional cruciform checkers, interweave checkers, interlock checkers, pigeon-hole checkers and basket weave checkers and the like, such as those described in U.S. Pat. Nos. 1,895,302, 1,897,270, 1,976,575, 2,068,292, 2,221,416, 2,512,555, 2,833,532, 2,839,286, 4,108,733, 4,593,751, 5,005,635, 5,299,629, 5,531,586, 5,993,203, the entire content of each such prior issued patent being expressly incorporated hereinto by reference.

Thus, those in the art will recognize that that the description provided herein is presently considered to be the most practical and preferred embodiments of the invention and that the invention is not to be limited to the disclosed embodiments, but on the contrary, is intended to cover various modifications and equivalent arrangements included within the spirit and scope thereof.

What is claimed is:

1. A self-supporting refractory checker brick module of a checker brick pack for a glass furnace regenerator comprising:

multiple preformed refractory checker bricks each being formed of a cured refractory material which defines a passageway, wherein the checker bricks are stacked in multiple off-set courses having length and width dimensions to form a honeycomb structure thereof such that the passageways of the checker bricks in one of the courses are offset with the passageways of the checker bricks in an adjacent course, wherein the checker bricks in the module are bonded to one another by a bonding agent, and wherein the module comprises at least two sides formed of off-set longitudinally split checker bricks which are bisected lengthwise at a substantially vertical plane so as to establish respective exposed edges of the split checker bricks that are capable of alignment with similar exposed edges of split checker bricks of an adjacent side of another checker brick module forming the checker brick pack of the glass furnace regenerator, and wherein each course comprises at least two checker bricks at each side of the module in each of the length and width dimensions thereof exclusive of the longitudinally split checker bricks.

2. The refractory checker brick module as in claim 1, wherein the pre-formed checker bricks are selected from the group consisting of tubular checker bricks, cruciform checker bricks, interweave checker bricks, interlock checker bricks, pigeon-hole checker bricks and basket weave checker bricks.

3. The refractory checker brick module as in claim 1, wherein the pre-formed checker bricks define central tubular passageways.

4. The refractory checker brick module as in claim 3, wherein the pre-formed checker bricks are tubular parallelepipeds formed of a cured refractory material.

5. The refractory module according to claim 3, wherein the checker bricks are tubular square parallelepipeds.

6. The refractory module according to claim 5, wherein the module comprises four courses of the off-set checker bricks.

7. The refractory checker brick module as in claim 1, wherein the pre-formed checker bricks are pressed or cast.

8. The refractory checker brick module as in claim 1, wherein the bonding agent is a sacrificial bonding agent.

9. The refractory checker brick module as in claim 1, wherein the bonding agent is an epoxy adhesive bonding agent.

10. The refractory module as in claim 1, wherein the module includes opposed side edges formed of the off-set longitudinally split checker bricks.

11. The refractory module as in claim 1, wherein the module includes opposed side edges and an end edge formed of off-set longitudinally split checker bricks.

12. The refractory module according to claim 1, wherein the module comprises at least three courses of the off-set checker bricks.

13. The refractory module according to claim 1, wherein each course comprises three checker bricks at the at least two sides of the module in each of length and width dimensions thereof exclusive of the longitudinally split checker bricks.

14. The refractory module according to claim 1, wherein each course comprises two checker bricks at one of the at least two sides of the module in a width dimension and three checker bricks at another of the at least two sides of the module in a length dimension thereof, exclusive of the longitudinally split checker bricks.

15. The refractory checker brick module as in claim 1, wherein the bonding agent is a non-sacrificial bonding agent.

* * * * *